(12) United States Patent
Onoe et al.

(10) Patent No.: US 8,646,439 B2
(45) Date of Patent: Feb. 11, 2014

(54) FUEL INJECTION APPARATUS FOR INTERNAL COMBUSTION ENGINE

(75) Inventors: Ryota Onoe, Susono (JP); Mamoru Yoshioka, Susono (JP); Fumito Chiba, Susono (JP); Takahiro Tsukagoshi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/505,609

(22) PCT Filed: Mar. 8, 2010

(86) PCT No.: PCT/JP2010/053769
§ 371 (c)(1),
(2), (4) Date: May 2, 2012

(87) PCT Pub. No.: WO2011/111149
PCT Pub. Date: Sep. 15, 2011

(65) Prior Publication Data
US 2012/0318241 A1 Dec. 20, 2012

(51) Int. Cl.
*F02B 13/00* (2006.01)
*F02M 59/36* (2006.01)

(52) U.S. Cl.
USPC .......................... 123/575; 123/458; 701/112

(58) Field of Classification Search
USPC ......... 123/575, 576, 578, 516, 518, 519, 1 A, 123/198 DB, 457, 458; 701/112
See application file for complete search history.

(56) References Cited

U.S. PATENT DOCUMENTS

| 4,423,280 | A | * | 12/1983 | Dessau | 585/829 |
| 4,517,402 | A | * | 5/1985 | Dessau | 585/820 |
| 5,051,244 | A | * | 9/1991 | Dunne et al. | 423/212 |
| 5,271,914 | A | * | 12/1993 | Sugimoto et al. | 95/141 |
| 8,105,426 | B2 | * | 1/2012 | Kosugi et al. | 96/153 |

(Continued)

FOREIGN PATENT DOCUMENTS

JP  A-2006-257907  9/2006
JP  A-2008-088941  4/2008

(Continued)

OTHER PUBLICATIONS

Mar. 30, 2010 International Search Report issued in International Patent Application No. PCT/JP2010/053769 (with translation).

(Continued)

*Primary Examiner* — Thomas Moulis
(74) *Attorney, Agent, or Firm* — Oliff PLC

(57) ABSTRACT

The fuel injection apparatus for the internal combustion engine includes: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol. In this fuel injection apparatus, it is determined whether or not a fuel pressure is higher than a predetermined low fuel pressure when a request is issued for bringing an internal combustion engine to a stop. If it is determined that the fuel pressure is higher than the low fuel pressure, the fuel pressure is kept at the low fuel pressure for a predetermined period of time before the internal combustion engine is brought to a stop.

4 Claims, 5 Drawing Sheets

(56) References Cited

U.S. PATENT DOCUMENTS

| | | | |
|---|---|---|---|
| 8,312,867 B2* | 11/2012 | Pursifull et al. | 123/516 |
| 8,459,238 B2* | 6/2013 | Pursifull et al. | 123/516 |
| 2008/0092851 A1 | 4/2008 | Arakawa et al. | |
| 2009/0159057 A1 | 6/2009 | Pursifull et al. | |
| 2009/0306879 A1* | 12/2009 | Takubo | 701/104 |

FOREIGN PATENT DOCUMENTS

| | | |
|---|---|---|
| JP | A-2008-106623 | 5/2008 |
| JP | A-2008-248840 | 10/2008 |
| JP | A-2009-36151 | 2/2009 |
| JP | A-2009-150397 | 7/2009 |
| JP | A-2009-257309 | 11/2009 |
| JP | A-2009-281330 | 12/2009 |

OTHER PUBLICATIONS

U.S. Appl. No. 13/508,274, filed May 4, 2012, in the name of Mamoru Yoshioka et al.

Jun. 27, 2013 Office Action issued in U.S. Appl. No. 13/508,274.

* cited by examiner

START (after engine starting)
100: Is there request for stopping engine?
102: Low fuel pressure injection state?
104: Stop engine
106: Run with low fuel pressure injection for predetermined period of time
END

FUEL INJECTION APPARATUS FOR INTERNAL COMBUSTION ENGINE

TECHNICAL FIELD

The present invention relates to a fuel injection apparatus for an internal combustion engine.

BACKGROUND ART

A known internal combustion engine can use a blended fuel that is a mixture of gasoline and alcohol such as ethanol or methanol. FIG. 7 is a chart showing a relationship between a distillation rate and a temperature of E80 (a blended fuel with 80% ethanol), E20 (a blended fuel with 20% ethanol), and E0 (100% gasoline). Gasoline is composed of multiple components including one having a low boiling point which contributes to an outstanding vaporization characteristic even at low temperatures. Alcohol, on the other hand, is composed of a single component and thus has a fixed boiling point which is high (about 78° C. for ethanol). As is known from FIG. 7, therefore', a blended fuel having a high concentration of alcohol, such as E80, has a drawback that the fuel is extremely difficult to vaporize at temperatures lower than the boiling point of alcohol. Note that a blended fuel having a relatively low alcohol concentration, such as E20, may actually more readily vaporize than 100% gasoline because of azeotropic phenomenon.

For the reasons as described above, when a blended fuel having a high alcohol concentration is used, substantially only the gasoline component vaporizes of the blended fuel injected from a fuel injector during cold starting of the internal combustion engine, with very little of the alcohol component vaporizing. This results in an insufficient amount of vaporized fuel that contributes to combustion, thus posing a problem of tendency toward poor startability. In addition, the starting relies only on the gasoline component of the blended fuel injected, so that a large amount of fuel needs to be injected at starting in order to compensate for the insufficiency. An amount of alcohol component many times the amount of gasoline component that has contributed to combustion fails to vaporize and burn, flowing past a combustion chamber into an exhaust path in a form of HC. This results in a problem in that the amount of HC discharged into the atmosphere tends to be extremely large during cold starting.

JP-A-2008-248840 discloses an internal combustion engine to which a blended fuel of gasoline and ethanol is supplied, wherein water is added to a fuel tank that accumulates the blended fuel to thereby separate and extract ethanol water from the blended fuel, and alcohol water is allowed to be injected into an intake port during heavy load operation. The internal combustion engine includes: a main tank that communicates with a gasoline injection valve; and a sub-tank that communicates with an ethanol water injection valve. The main tank accumulates residual fuel (gasoline) to which water has been added, and the sub-tank accumulates the separated ethanol water. Being able to inject gasoline or ethanol water at any desired timing, the internal combustion engine can solve the foregoing problem.

PRIOR ART DOCUMENTS

Patent Documents

Patent Document 1: JP-A-2008-248840

SUMMARY OF THE INVENTION

Problem to be Solved by the Invention

The related art technique, however, requires two separate fuel supply systems, each including a fuel injector, a delivery pipe, and a fuel path, one for gasoline injection and the other for alcohol injection. This substantially doubles the cost, weight, and space requirements of the fuel supply systems, leading to a significantly increased cost, aggravated fuel economy due to the increased weight, and aggravated mountability. Additionally, in the related art system, the sub-tank has an upper surface communicating with a bottom surface of the main tank and a boundary therebetween is defined by a baffle plate having a plurality of holes. As a result, these fuels are likely to be mixed together and thus improperly separated under vehicle running conditions. The related art apparatus does not therefore properly solve the problems of startability and HC emissions into the atmosphere.

The present invention has been made to solve the foregoing problems and it is an object of the present invention to provide a fuel injection apparatus for an internal combustion engine using a blended fuel of gasoline and alcohol, capable of inhibiting, with a simple structure, emissions from being aggravated during use of the blended fuel.

Means for Solving the Problem

In accomplishing the above object, according to a first aspect of the present invention, there is provided a fuel injection apparatus for an internal combustion engine including: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the adsorbent having a characteristic that an adsorbed amount of alcohol is small when a fuel pressure is low and large when the fuel pressure is high, the fuel injection apparatus comprising:

means for determining whether or not there is a request for bringing the internal combustion engine to a stop;

means for determining whether or not the fuel pressure is higher than a predetermined low fuel pressure when it is determined that there is the request;

means for keeping the fuel pressure at the low fuel pressure for a predetermined period of time when it is determined that the fuel pressure is higher than the low fuel pressure; and means for bringing the internal combustion engine to a stop after a lapse of the predetermined period of time.

According to a second aspect of the present invention, there is provided the fuel injection apparatus as described in the first aspect, wherein:

the predetermined period of time is a period of time required for at least one each fuel injection sequence to be performed in each of cylinders in the internal combustion engine.

According to a third aspect of the present invention, there is provided the fuel injection apparatus as described in the first or second aspect, wherein:

the low fuel pressure allows a good part of alcohol adsorbed on the adsorbent to be desorbed.

Effects of the Invention

The fuel injector of the present invention includes the adsorbent disposed in the internal space of the leading end portion thereof, the adsorbent being capable of selectively adsorbing the alcohol component in the blended fuel of gasoline and alcohol. The fuel injector of the present invention can therefore reduce the alcohol concentration of the fuel to be injected immediately when necessary (e.g. during cold starting). Since the foregoing effect can be achieved without having a fuel injector for use exclusively for alcohol, the fuel supply system can be simplified for reduction in cost and weight.

In the first aspect of the present invention, it is determined whether or not the fuel pressure is higher than the predetermined low fuel pressure when there is a request for bringing the internal combustion engine to a stop. If the fuel pressure is higher than the low fuel pressure, the fuel pressure is kept at the low fuel pressure for a predetermined period of time before the internal combustion engine is brought to a stop. According to the present invention, the alcohol adsorbed on the adsorbent is therefore desorbed before the internal combustion engine is brought to a stop. Thus, a situation can be effectively avoided in which the alcohol concentration of the blended fuel to be injected from the fuel injector can not be effectively lowered during the next engine starting.

In the second aspect of the present invention, if the fuel pressure is higher than the predetermined low fuel pressure when the request is issued for stopping the internal combustion engine, the fuel pressure is brought to the low fuel pressure. The internal combustion engine is brought to a stop after at least one each fuel injection sequence is performed in each of the cylinders in the internal combustion engine. According to the present invention, therefore, alcohol desorbed from the adsorbent is effectively discharged out of the internal space before the internal combustion engine is brought to a stop.

In the third aspect of the present invention, a good part of alcohol adsorbed on the adsorbent can be desorbed before the internal combustion engine is brought to a stop. According to the present invention, therefore, a situation can be effectively avoided in which the alcohol concentration of the blended fuel to be injected from the fuel injector can not be effectively lowered during the next engine starting.

MODE FOR CARRYING OUT THE INVENTION

Figure 1:
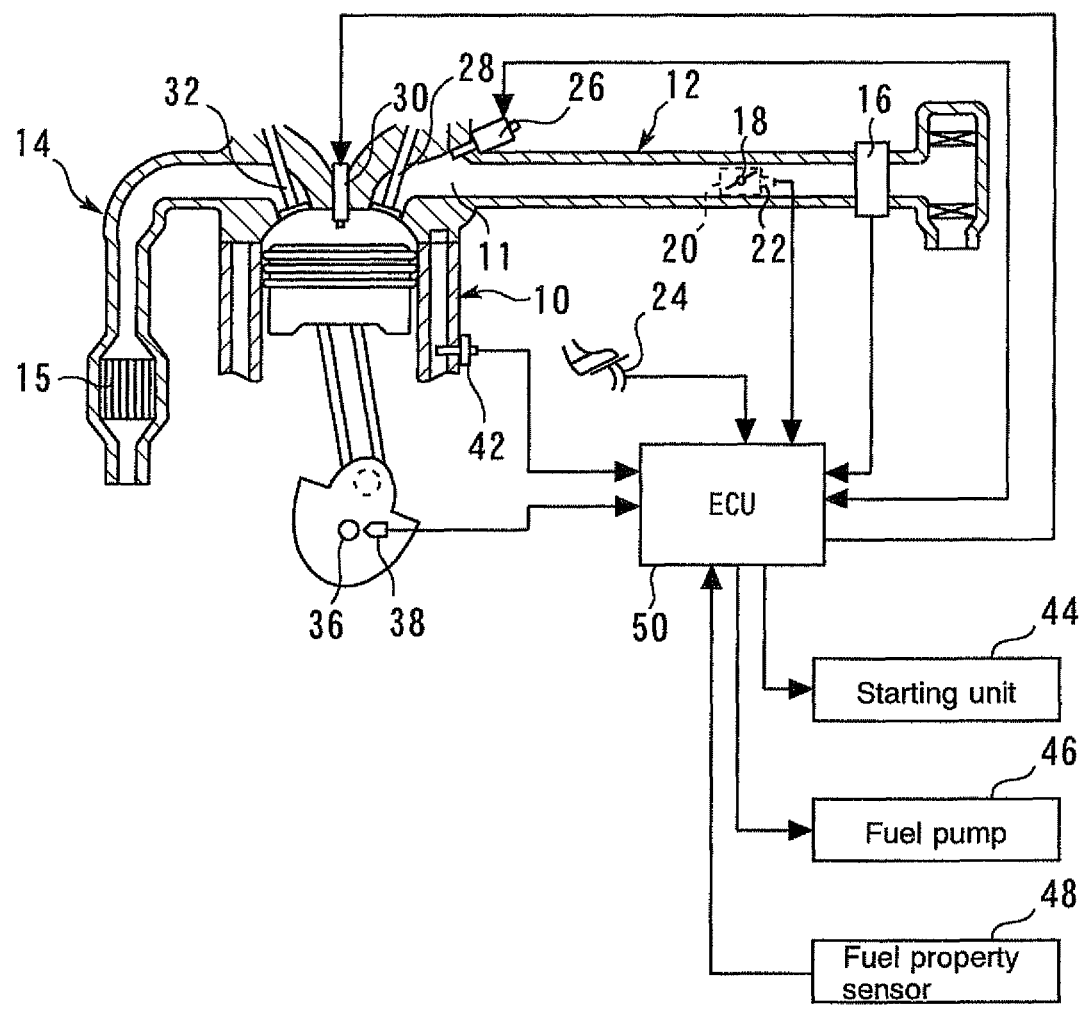
FIG. 1 is a diagram for illustrating a system configuration of a first embodiment of the present invention.

An embodiment of the present invention will be described below with reference to the accompanying drawings. In each of the drawings, like or equal elements are identified by the same reference numerals and descriptions therefor will not to be duplicated. The embodiments to be described hereunder are not intended to limit the present invention.

First Embodiment

Arrangements of the First Embodiment

FIG. 1 is a diagram for illustrating a system configuration of a first embodiment of the present invention. Referring to FIG. 1, the system according to this embodiment includes an internal combustion engine 10. The internal combustion engine 10 is used, for example, as a driving power source for a vehicle. The internal combustion engine 10 of this embodiment is an in-line four-cylinder type; however, the number and arrangement of cylinders of the internal combustion engine according to this embodiment are not specifically limited. FIG. 1 is a cross-sectional view of a single cylinder of the internal combustion engine 10.

The internal combustion engine 10 is operable on not only gasoline, but also a fuel that is a mixture composed of gasoline and ethanol, methanol, or other type of alcohol (hereinafter referred to also as an "alcohol-blended fuel" or a "blended fuel"). In this case, the alcohol-blended fuel may range from one having a low concentration (e.g. about several percent) of an alcohol component (ratio of the alcohol component) to one having a high concentration (e.g. 80% or more).

The internal combustion engine 10 is connected with an intake path 12 and an exhaust path 14. An air flow meter 16 for detecting an intake air amount is disposed on the intake path 12. A throttle valve 18 is disposed downstream of the air flow meter 16. The throttle valve 18 has an opening adjusted by operation of a throttle motor 20. A throttle position sensor 22 for detecting the opening of the throttle valve 18 is disposed near the throttle valve 18. A catalyst 15 for purifying an exhaust gas is disposed on the exhaust path 14.

A fuel injector 26 for injecting fuel into an intake port 11 is disposed at each cylinder of the internal combustion engine 10. In addition, an intake valve 28, an ignition plug 30, and an exhaust valve 32 are disposed on each cylinder of the internal combustion engine 10.

A crank angle sensor 38 capable of detecting a rotational angle of a crankshaft 36 (crank angle) is disposed near the crankshaft 36 of the internal combustion engine 10. The crank angle sensor 38 can detect the crank angle and a speed of the internal combustion engine 10.

The system of this embodiment generally includes an accelerator position sensor 24, a coolant temperature sensor 42, a starting unit 44, a fuel pump 46, a fuel property sensor 48, and an ECU (electronic control unit) 50. Specifically, the accelerator position sensor 24 detects an amount of depression of an accelerator pedal on a driver's seat side of the vehicle on which the internal combustion engine 10 is mounted. The coolant temperature sensor 42 detects a coolant temperature of the internal combustion engine 10. The starting unit 44 includes a motor for rotatably driving the crankshaft 36 at starting of the internal combustion engine 10. Sensors and actuators of various types including the above are electrically connected to the ECU 50.

Figure 2:
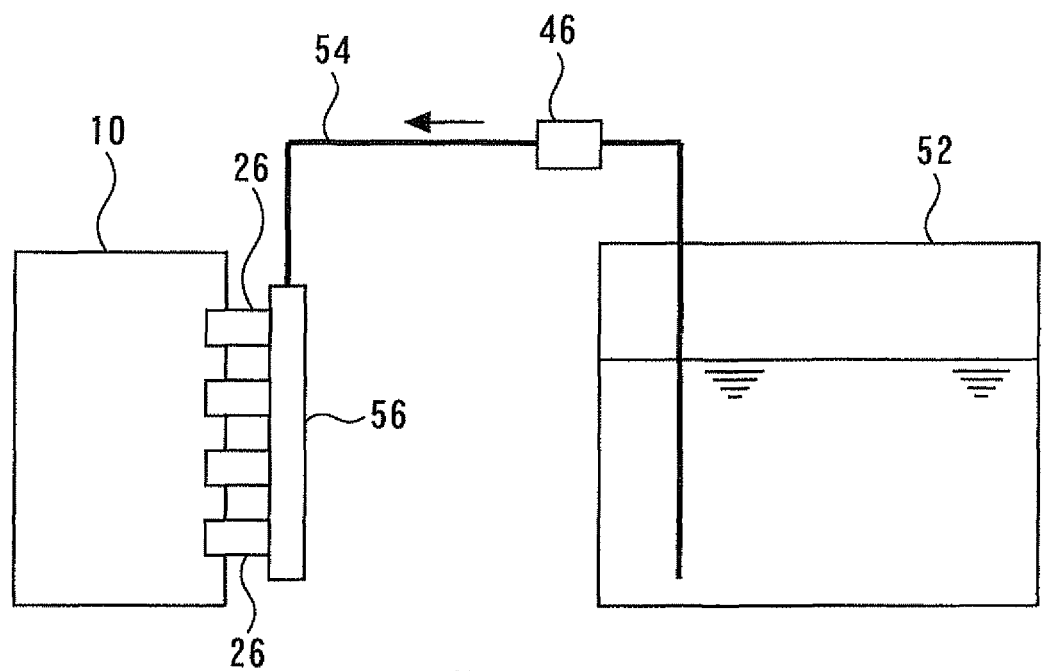
FIG. 2 is an illustration showing schematically a fuel system that supplies the internal combustion engine with fuel.

FIG. 2 is an illustration showing schematically a fuel system that supplies the internal combustion engine 10 with fuel. Referring to FIG. 2, the system of this embodiment includes a fuel tank 52. The fuel tank 52 is connected to a delivery pipe 56 via a fuel supply path 54. The fuel pump 46 that pressurizes fuel is disposed midway in the fuel supply path 54. This is, however, not the only possible location at which to dispose the fuel pump 46; rather, the fuel pump 46 may be disposed, for example, inside the fuel tank 52.

Fuel accumulated in the fuel tank 52 is pressurized by the fuel pump 46 and sent to the delivery pipe 56 through the fuel supply path 54. The delivery pipe 56 distributes fuel to the fuel injector 26 of each cylinder. The fuel pump 46 is adapted to be able to send fuel to the delivery pipe 56 by regulating a fuel pressure to a value commanded by the ECU 50. Specifically, in the system of this embodiment, the fuel pressure inside the fuel injector 26 (specifically, a fuel injection pressure) is adjustable with the fuel pump 46.

Concentration of alcohol in fuel to be supplied to the fuel injector 26, specifically, fuel accumulated in the fuel tank 52 (hereinafter referred to as "In-tank fuel") increases or decreases according to the alcohol concentration of fuel selected for refueling by a user. In this embodiment, the alcohol concentration of the in-tank fuel can be detected by the fuel property sensor 48 disposed midway in the fuel supply path 54. For the fuel property sensor 48, a type of sensor may be used that detects the alcohol concentration by, for example, measuring dielectric constant or refractive index of the fuel. The position at which the fuel property sensor 48 is disposed in the figure is not the only possible arrangement. For example, the fuel property sensor 48 may be disposed in the fuel tank 52 or on the delivery pipe 56. Further, in the present invention, the method for detecting the alcohol concentration of the in-tank fuel is not limited to one using the fuel property sensor 48. For example, the alcohol concentration of the fuel may be detected (estimated) from a learned value in an air-fuel ratio feedback control. Specifically, the gasoline and the alcohol have different stoichiometric air-fuel ratio values, so that the stoichiometric air-fuel ratio value of the alcohol-blended fuel varies depending on the alcohol concentration. This allows the alcohol concentration of the in-tank fuel to be detected (estimated) based on the stoichiometric air-fuel ratio value learned using a signal fed back from an air-fuel ratio sensor (not shown) disposed in the exhaust path 14.

Figure 3:
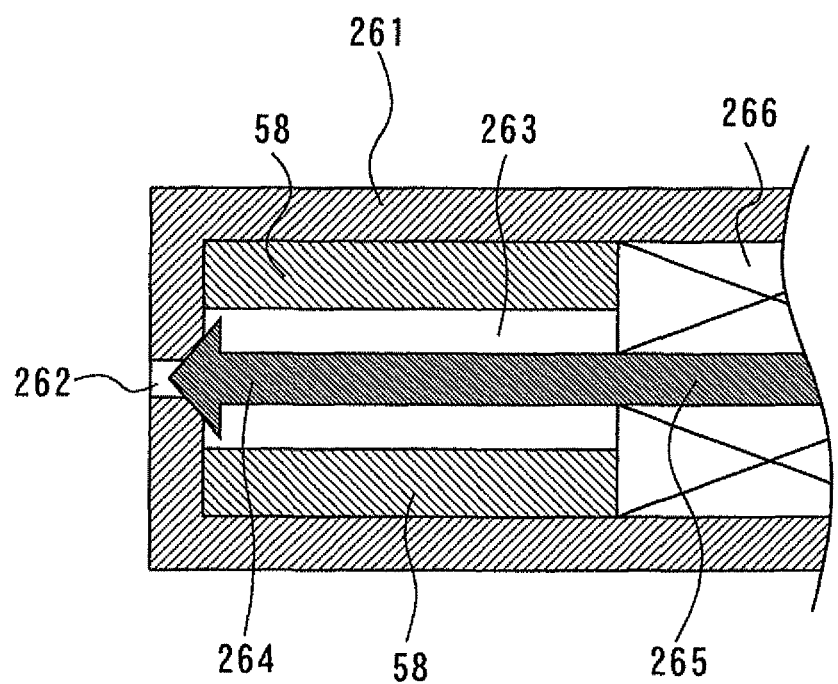
FIG. 3 is an enlarged cross-sectional view showing a leading end portion of the fuel injector.

FIG. 3 is an enlarged cross-sectional view showing a leading end portion of the fuel injector 26 included in the internal combustion engine 10 of this embodiment. Referring to FIG. 3, the fuel injector 26 has a leading end portion 261. The leading end portion 261 includes an injection port 262 for injecting fuel and an internal space 263 in which fuel is accumulated (filled with fuel). A needle valve 264 as an injection valve is passed through the internal space 263. The needle valve 264 opens and closes the injection port 262. A plunger 265 is integrally formed on a proximal end side of the needle valve 264. A solenoid coil 266 is disposed around the plunger 265. When the solenoid coil 266 is energized, the plunger 265 is pulled in the solenoid coil 266, so that the plunger 265 and the needle valve 264 move to the proximal end side, which opens the injection port 262. This allows fuel in the internal space 263 to be injected from the injection port 262. When the solenoid coil 266 is de-energized, the plunger 265 and the needle valve 264 are brought back to their original positions by an urging force of a spring not shown. This closes the injection port 262 to stop injection. Such a fuel pressure in the internal space 263 of the fuel injector 26 (hereinafter referred to also simply as the "fuel pressure") can be controlled to vary from low to high by a command issued from the ECU 50 to the fuel pump 56 as described earlier.

An adsorbent 58 is disposed in the internal space 263 at the leading end portion 261 of the fuel injector 26. According to the arrangement shown in the figure, the adsorbent 58 is disposed in a tubular form along an inner periphery of the internal space 263. Specifically, the adsorbent 58 is disposed so as to surround an outer peripheral side of the needle valve 264. A type having a property of selectively adsorbing the alcohol component in the alcohol-blended fuel is selected as the adsorbent 58. As a component material of such an adsorbent 58, a highly hydrophilic, porous body having fine pores on a molecule level that can take in alcohol molecules may be used; typically, zeolite is preferably used. Particularly preferably, a type of zeolite having a strong polarity is used. Use of the zeolite having the strong polarity allows alcohol molecules having a strong polarity to be reliably and selectively adsorbed from the fuel containing the gasoline component. Note also that, for example, pore size varies depending on a skeletal structure of the porous body used for the adsorbent 58 (for example, type A, type Y, and type X for zeolite). By selecting an optimum skeletal structure according to the size of the alcohol molecule in question, therefore, a favorable alcohol adsorption property can be obtained. To adsorb ethanol, for example, type A zeolite can be particularly preferably used.

Operations in the First Embodiment (Adsorption and Desorption of Alcohol in the Adsorbent)

The adsorbent 58 has a property that the amount of alcohol adsorbed onto the adsorbent 58 (hereinafter referred to as an "adsorbed amount of alcohol" or an "adsorbed amount") is small when an ambient fuel pressure is low and the adsorbed amount of alcohol is large when the fuel pressure is high. The embodiment utilizes this property to control the adsorbed amount of alcohol on the adsorbent 58, thereby allowing the alcohol concentration of the fuel injected from the fuel injector 26 to be lower than that of the fuel supplied thereto (specifically, the in-tank fuel). Specifically, when the fuel pressure is increased from a low pressure state in which the adsorbed amount of alcohol is small to a high pressure state in which the adsorbed amount of alcohol is large, the alcohol component of the blended fuel resident in the internal space 263 is selectively adsorbed onto the adsorbent 58. This results in a decreased alcohol concentration of the blended fuel resident in the internal space 263, and an increased gasoline concentration thereof. By increasing the fuel pressure and injecting fuel from the fuel injector 26, therefore, the alcohol concentration of the fuel injected from the fuel injector 26 can be made lower than the alcohol concentration of the in-tank fuel.

Figure 4:
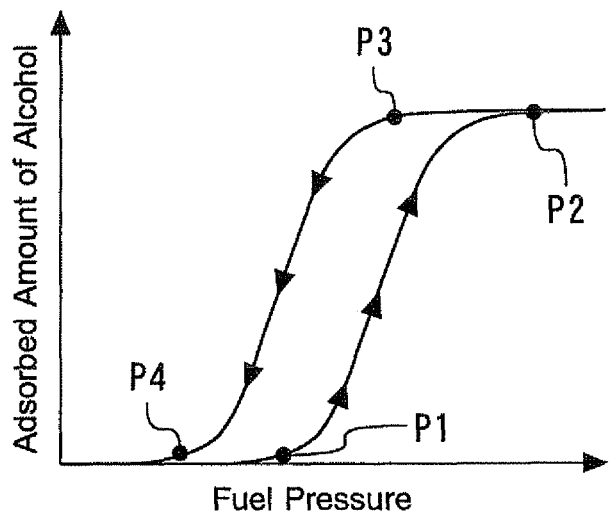
FIG. 4 is a graph showing a relationship between the fuel pressure and the adsorbed amount of alcohol on the adsorbent.

FIG. 4 is a graph showing a relationship between the fuel pressure and the adsorbed amount of alcohol on the adsorbent 58. As described earlier, the adsorbed amount of alcohol is small when the fuel pressure is low and large when the fuel pressure is high. Additionally, the adsorbed amount of alcohol has a hysteresis relative to a history of the fuel pressure as indicated by arrows affixed to curves in FIG. 4. Specifically, the curve on the right in FIG. 4 represents changes in the adsorbed amount of alcohol in a process of the adsorbent 58 adsorbing the alcohol when the fuel pressure is increased from a low pressure to a high pressure. The curve on the left in FIG. 4 represents changes in the adsorbed amount of alcohol in a process of the adsorbent 58 desorbing the adsorbed alcohol when the fuel pressure is decreased from a high pressure to a low pressure.

The ECU 50 can control adsorption of alcohol onto, or desorption of alcohol from, the adsorbent 58 by changing over a value of a set pressure of the fuel pump 46 between a low pressure and a high pressure to thereby vary the fuel pressure in the internal space 263 of the fuel injector 26. The adsorbed amount of alcohol onto the adsorbent 58 is saturated when the fuel pressure rises up to P2 in FIG. 4. Consequently, the fuel pressure is preferably set to more than P2 when the alcohol is to be adsorbed by the adsorbent 58. This allows an alcohol adsorption ability of the adsorbent 58 to be fully extracted. Note, however, that alcohol can be adsorbed onto the adsorbent 58 with a fuel pressure of P1 or more in FIG. 4. To let alcohol be adsorbed onto the adsorbent 58, therefore, the fuel pressure has only to be increased to a value higher than at least P1.

When the fuel pressure is decreased from a condition in which the adsorbed amount of alcohol onto the adsorbent 58 is saturated, substantially no amount of alcohol is desorbed from the adsorbent 58 with a pressure of up to P3 in FIG. 4. When the fuel pressure is lower than P3, desorption of alcohol from the adsorbent 58 is quickly started and, when the pressure is decreased to P4 in FIG. 4, the adsorbed amount of alcohol is substantially zero. To desorb alcohol from the adsorbent 58, therefore, the fuel pressure is preferably set to a value of P4 or lower. This allows a substantially whole amount of alcohol adsorbed onto the adsorbent 58 to be desorbed therefrom. Note, however, that the desorption of alcohol starts with a fuel pressure of P3 in FIG. 4 as described above. To let alcohol be desorbed from the adsorbent 58, therefore, the fuel pressure has only to be decreased down to a value less than at least P3.

(Alcohol Concentration Reduction Control During Cold Starting)

Figure 5:
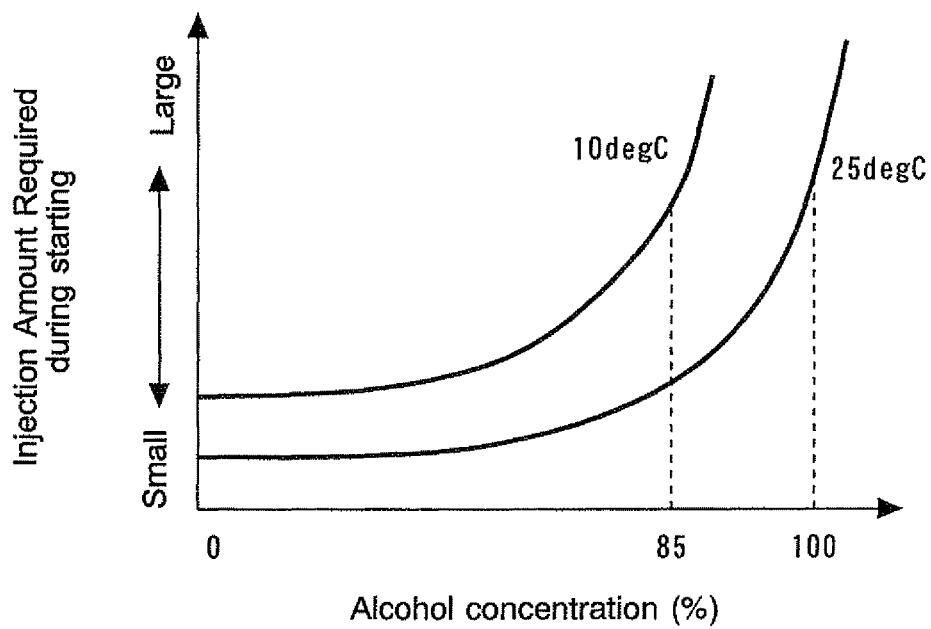
FIG. 5 is a graph for illustrating a relationship between the alcohol concentration and an injection amount required during starting.

An alcohol concentration reduction control during cold starting of the internal combustion engine 10 will be described below with reference to FIG. 5. FIG. 5 is a graph for illustrating a relationship between the alcohol concentration and an injection amount required during starting. As shown in the figure, the injection amount required during starting increases at higher concentrations of alcohol in a temperature range of room temperature or less (25° C. or less). More specifically, the injection amount required during starting increases sharply at an alcohol concentration of near 50 to 60%. This tendency is more conspicuous particularly at low temperatures of 10° C. or less. During cold starting of the internal combustion engine 10, therefore, a large amount of fuel with high concentrations of alcohol is injected, which poses a problem of aggravated HC emissions as a result of discharge of unburned alcohol.

In this embodiment, therefore, control is performed by using the abovementioned function so that, during the cold starting of the internal combustion engine 10, the alcohol concentration of the fuel injected from the fuel injector 26 is lower than the alcohol concentration of the in-tank fuel. This allows fuel with a lower alcohol concentration and a higher gasoline concentration than the in-tank fuel (hereinafter referred to as an "alcohol concentration reduced fuel") to be injected from the fuel injector 26 during the cold starting, even if the alcohol concentration of the in-tank fuel is high. Startability with good combustion can therefore be obtained and a sufficient amount of HC emissions into the atmosphere can be reduced.

In this apparatus in particular, the alcohol concentration reduced fuel can be generated in the internal space 263 disposed immediately before the injection port 262, which allows the alcohol concentration reduced fuel to be injected in the first injection sequence onward during starting. By contrast, in an arrangement in which the alcohol concentration reduced fuel is generated at a position before the fuel injector 26 (for example, the delivery pipe 56), the alcohol concentration reduced fuel can be injected only after the fuel injection sequence is repeatedly performed at least to replace the fuel in the adsorbed amount of alcohol in the fuel injector 26 with the alcohol concentration reduced fuel.

Being able to inject the alcohol concentration reduced fuel in the first injection sequence onward during starting is extremely effective in reducing the amount of HC emissions into the atmosphere for the following reasons. In the beginnings of cold starting, the catalyst 15 is yet to be warmed by the exhaust gas and remains inactive. As a result, most of HC discharged from the internal combustion engine 10 is discharged into the atmosphere without being purified. When combustion thereafter starts in the internal combustion engine 10, the exhaust gas starts flowing into the catalyst 15 to thereby warm the catalyst 15, so that the catalyst 15 starts exhibiting catalytic activity, resulting in HC being purified by the catalyst 15. In order to reduce the amount of HC emissions into the atmosphere during cold starting, therefore, it is extremely important to reduce the amount of HC discharged from the internal combustion engine 10 for the first several cycles during which the catalyst 15 is yet to be warmed. In this respect, this apparatus can inject the alcohol concentration reduced fuel starting with the first injection sequence during starting, so that the amount of alcohol component flowing to the exhaust path 14 without being burned can be reliably reduced. Thus, the amount of HC emissions into the atmosphere during cold starting can be effectively reduced.

When the adsorbed amount of alcohol on the adsorbent 58 is saturated, the adsorbent 58 becomes no longer adsorb alcohol. As a result, the alcohol concentration of fuel injected is brought back to the original level, specifically, the alcohol concentration of the in-tank fuel, through the process of repeated fuel injection sequences performed from the fuel injector 26 after the internal combustion engine 10 has been started. However, the catalyst 15 is warmed enough during the process to exhibit the activity, which starts purification of HC with the catalyst 15. Discharge of HC into the atmosphere can therefore be sufficiently inhibited. Meanwhile, the internal combustion engine 10 is also warmed during a period through which the alcohol concentration of fuel injected from the fuel injector 26 returns to the original level, which promotes vaporization of the alcohol component. Aggravation of driving stability of the internal combustion engine 10 after starting can therefore be sufficiently inhibited.

Characteristic Operations of the First Embodiment

As described earlier, when the alcohol concentration reduction control is performed during the cold starting of the internal combustion engine 10, alcohol is adsorbed onto the adsorbent 58. Preferably, therefore, the adsorbed alcohol is desorbed during operation of the internal combustion engine 10 in preparation for the subsequent cold starting. When the internal combustion engine 10 is warmed up, therefore, the process is normally performed to lower the fuel pressure. The alcohol adsorbed on the adsorbent 58 is thereby desorbed effectively for the subsequent cold starting.

It is, however, assumed that, depending on an operating condition of the internal combustion engine 10, an engine stop request is issued immediately after the Internal combustion engine 10 has been cold-started. In such cases, the engine is brought to a stop with alcohol left adsorbed on the adsorbent 58, so that the alcohol is not effectively adsorbed during the subsequent cold starting, resulting in a large amount of unburned alcohol being discharged.

In this embodiment, therefore, if alcohol is still adsorbed on the adsorbent 58 when the engine stop request is issued, the alcohol is first desorbed and then the engine is brought to a stop. More specifically, if the fuel pressure is set to a high fuel pressure when the engine stop request is issued, the fuel pressure is set to a low fuel pressure for a predetermined period of time. The alcohol adsorbed on the adsorbent 58 is thereby effectively desorbed before injection is performed from the fuel injector 26.

Preferably, the period of time that begins when the fuel pressure is set to the low fuel pressure and ends when the engine is stopped is set to a period of time required for at least one each fuel injection sequence to be performed in each of cylinders in the internal combustion engine 10. This allows the alcohol concentration in the internal space 263 to be lowered to a level equivalent to that of the in-tank fuel. The alcohol concentration can thereby be effectively reduced during the next cold starting.

Specific Process Performed in the First Embodiment

Figure 6:
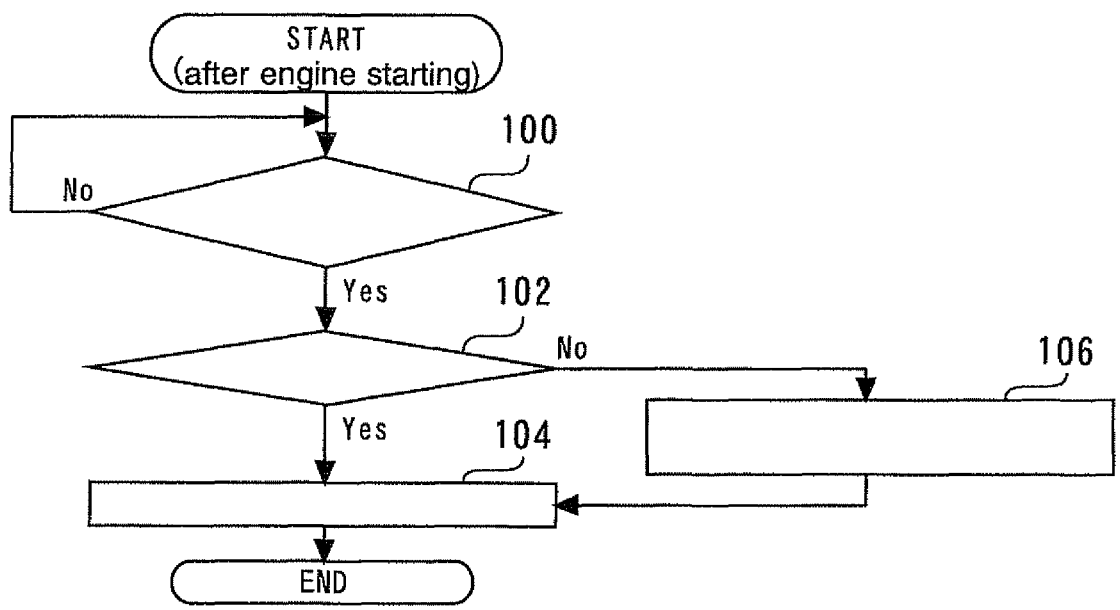
FIG. 6 is a flow chart showing a routine that is executed in accordance with a first embodiment of the present invention.
Figure 7:
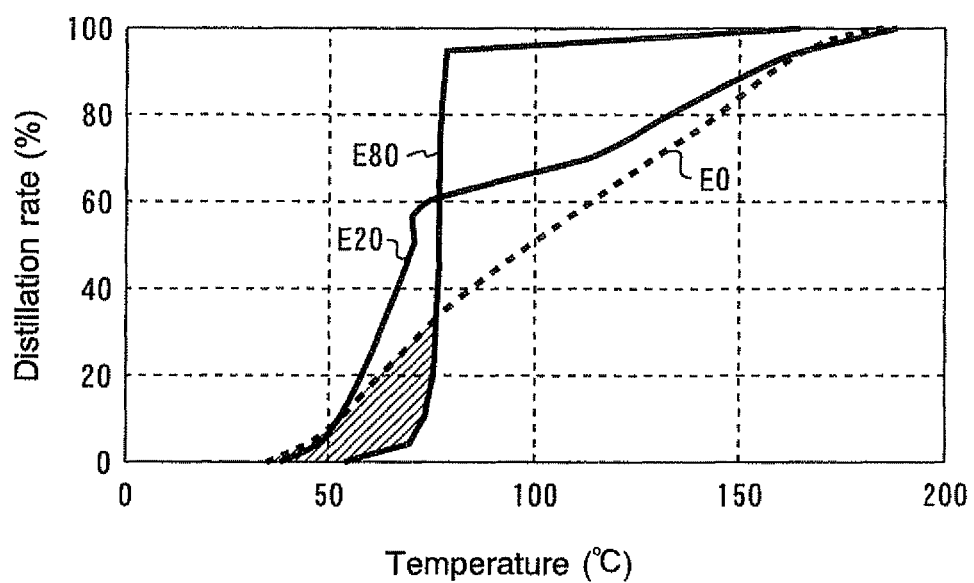
FIG. 7 is a chart showing a relationship between a distillation rate and a temperature of E80, E20, and E0.

Specific process performed in this embodiment will be described below with reference to FIG. 6. FIG. 6 is a flow chart showing a routine performed by the ECU 50 in this embodiment for achieving the above-described engine stop control. Referring to the routine shown in FIG. 6, it is first determined whether or not a request for stopping the internal combustion engine 10 is issued (step 100). Specifically, it is here determined whether or not an ignition (IG) is turned OFF. If it is determined, as a result, that the request for stopping the internal combustion engine 10 is yet to be issued, step 100 is repeatedly performed.

If it is determined in step 100 that the request for stopping the internal combustion engine 10 is issued, the operation proceeds to the next step in which it is determined whether or not the fuel pressure is set to the low fuel pressure. If it is determined, as a result, that the fuel pressure is set to the low fuel pressure, it is then determined that the alcohol has already been desorbed from the adsorbent 58. The operation then proceeds to the next step in which the internal combustion engine 10 is brought to a stop promptly.

If it is determined in step 104 that the fuel pressure is not set to the low fuel pressure, it is then determined that the alcohol is still adsorbed on the adsorbent 58 and the operation proceeds to the next step in which a stop delay control of the internal combustion engine 10 is performed (step 106). Specifically, the fuel pressure of the internal combustion engine 10 is set to the low fuel pressure. The internal combustion engine 10 is then operated for a predetermined period of time. The predetermined period of time is set to a period of time during which at least one each fuel injection sequence can be performed in each of the cylinders in the internal combustion engine 10. When step 106 is performed, the operation proceeds to step 104, so that the internal combustion engine 10 is brought to a stop promptly.

As described heretofore, in the apparatus of this embodiment, when a request is issued for stopping the internal combustion engine 10, the alcohol adsorbed on the adsorbent 58 is desorbed and injection is performed before the internal combustion engine 10 is brought to a stop. This allows the alcohol concentration of injected fuel to be effectively lowered during the next cold starting, so that aggravation of emissions caused by a discharge of unburned alcohol can be effectively inhibited.

In the first embodiment described above, performance of step 100 by the ECU 50 achieves the "determining means" in the first aspect of the present invention, performance of step 102 achieves the "fuel pressure determining means" in the first aspect of the present invention, performance of step 106 achieves the "means for bringing the fuel pressure to a low fuel pressure" in the first aspect of the present invention, and performance of step 104 achieves the "means for bringing the internal combustion engine to a stop" in the first aspect of the present invention, respectively.

DESCRIPTION OF REFERENCE CHARACTERS

10 internal combustion engine
11 intake port
12 intake path
14 exhaust path
15 catalyst
16 air flow meter
18 throttle valve
24 accelerator position sensor
26 fuel injector
261 leading end portion
262 injection nozzle
263 internal space
264 needle valve
265 plunger
266 solenoid coil
28 intake valve
30 ignition plug
32 exhaust valve
42 coolant temperature sensor
52 fuel tank
54 fuel supply path
56 delivery pipe
58 adsorbent

The invention claimed is:

1. A fuel injection apparatus for an internal combustion engine including:
   a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the adsorbent having a characteristic that an adsorbed amount of alcohol is small when a fuel pressure is low and large when the fuel pressure is high, the fuel injection apparatus comprising:
   means for determining whether or not there is a request for bringing the internal combustion engine to a stop;
   means for determining whether or not the fuel pressure is higher than a predetermined low fuel pressure when it is determined that there is the request;
   means for keeping the fuel pressure at the low fuel pressure for a predetermined period of time when it is determined that the fuel pressure is higher than the low fuel pressure; and
   means for bringing the internal combustion engine to a stop after a lapse of the predetermined period of time.

2. The fuel injection apparatus for the internal combustion engine according to claim 1, wherein:
   the predetermined period of time is a period of time required for at least one each fuel injection sequence to be performed in each of cylinders in the internal combustion engine.

3. The fuel injection apparatus for the internal combustion engine according to claim 1, wherein:
   the low fuel pressure allows a large part of alcohol adsorbed on the adsorbent to be desorbed.

4. A fuel injection apparatus for an internal combustion engine including:
   a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the adsorbent having a characteristic that an adsorbed amount of alcohol is small when a fuel pressure is low and large when the fuel pressure is high, the fuel injection apparatus comprising:

a device for determining whether or not there is a request for bringing the internal combustion engine to a stop;

a device for determining whether or not the fuel pressure is higher than a predetermined low fuel pressure when it is determined that there is the request;

a device for keeping the fuel pressure at the low fuel pressure for a predetermined period of time when it is determined that the fuel pressure is higher than the low fuel pressure; and a device for bringing the internal combustion engine to a stop after a lapse of the predetermined period of time.

\* \* \* \* \*